2,878,125

ART OF STABILIZING MALT BEVERAGE

Mortimer W. Brenner, Hartsdale, N. Y., assignor to Brewing Industries Research Institute, Chicago, Ill., a corporation of Illinois No Drawing. Application October 11, 1956
Serial No. 615,243

1 Claim. (Cl. 99—48)

This invention describes carbonated malt beverages of superior stability and methods for producing them.

In my U. S. Patent No. 2,763,554, issued September 18, 1956, it was disclosed that the presence of compounds of oxalic acid, particularly calcium oxalate in metastable equilibrium is responsible for an unstable condition in carbonated malt beverages, such as beers and ales, known commonly as "overfoaming," or "gushing," or "wild beer." This condition has, in the past, occurred in malt beverages of varied origin in an unpredictable fashion, particularly in bottles or cans, and frequently has an adverse effect on consumer acceptance. Up to the time of the disclosure in my application mentioned above, the etiology of gushing was poorly understood, and consequently, there were no adequate means available to brewers to assure control or elimination of this undesirable characteristic which might afflict their products from time to time.

As conducive to a clear understanding of this invention it should be noted that the metastable system from which oxalates precipitate in insoluble form after the beverage has been sealed in the consumer package, is complex; probably involving interactions between oxalate and the larger molecular structures present, such as proteins, peptides, polysaccharides and other carbohydrate fractions, pectins or tannins, as well as certain cations in addition to calcium. As nearly all of the cereal products and the hops used as raw materials for manufacture of malt beverages contain oxalates in significant quantities, it will be understood that the finished beverages normally contain varying amounts of oxalate. Therefore, no malt beverage made by procedures known and used in the art prior to this disclosure and my prior invention can be said to have been free of oxalate nor to have been knowledgably protected against the tendency to "gush."

Generally speaking, carbonated malt beverages prepared by normal brewing practice will contain, when packaged, from 8 to 20 p. p. m. of oxalate ion, if not specially treated in accordance with this invention and my patent above referred to. Malt beverages with this range of oxalate content will show incipient tendency to gush, if tested under extreme conditions, and will present an uncontrolled potential threat of customer dissatisfaction to the brewer. The methods described herein, and in my prior patent will generally reduce the oxalate content of the packaged carbonated malt beverage to a maximum of about 4 p. p. m., or less than 30% of its normal value. This marked reduction in oxalate content has a profound effect on the incipient tendency to gush. Malt beverages so treated show little or no capacity to "overfoam" even when tested after subjection to extreme conditions of storage and handling designed to promote this undesirable phenomenon.

It should be further noted that the course of precipitation of unstable oxalates may involve not only the development of the tendency for the malt beverage to gush when the package is opened, but also may cause a loss of clarity or haziness which is undesirable for consumer acceptance. Improved stability toward gushing therefore tends to improve the shelf life of the product in respect to haze development, although it is well known that other factors, such as presence of certain protein fractions, oxidation, and improperly digested carbohydrates, also contribute to the development of such turbidities.

Because of the delicate balance of constituents of malt beverages, removal of oxalate and other undesirable haze-forming substances which may coprecipitate with it, without eliminating significant amounts of the desirable constituents which contribute to the flavor and character of malt beverages is technically very difficult. This may be more fully appreciated if it is understood that the normal oxalate ion content of beers and ales may be in the range of 8 to 20 p. p. m., whereas, substances which contribute significantly to the flavor and aroma may be present in from 5 to 50 parts per billion.

It is among the objects of this invention to provide a malt beverage which is substantially free of oxalate ion and therefore has little or no capacity to develop "gushing."

It is a further object to provide malt beverage substantially free of oxalate ion which exhibits improved stability against the development of haziness during storage after the package is sealed.

Another object is to provide specific procedures for accomplishing the removal of oxalate from malt beverages without significantly disturbing the composition of other constituents which contribute distinctive flavor and aroma charactertistics to the product.

In my patent referred to above, the use of soluble calcium salts is disclosed as a means of eliminating the major portion of the oxalate as insoluble macrocrystalline oxalate prior to bottling the beverage. In malt beverages, especially where the colloidal equilibrium is so complex that reduction of the oxalate content to a level at which gushing will not take place may be delayed when treatment by calcium ions is employed, the improvements described herein will produce more rapid and effective results.

I have found that a malt beverage substantially oxalate-free can be produced by treating the beverage with oxalic acid digesting enzymes. This selectively destroys the oxalate present according to the following equation:

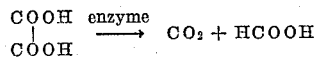

Relatively crude enzyme materials from bacterial or fungal sources are effective in minute concentration (in the order of 1.0 to 100 p. p. m., depending on the amount of oxalic acid digesting enzyme present in the crude preparation). Treatment may be carried out at any point in the processing, but preferably in ruh or storage after as much of the oxalate in the malt beverage as possible has precipitated as "beer stone" or calcium oxalate and has been removed by filtration in the normal processing operation. Under such conditions the amount of enzyme required may be lessened. In many cases it may be convenient to add the oxalate digesting enzyme simultaneously with proteolytic enzymes with which malt beverages are frequently treated as a means of reducing the tendency to develop "chill haze," previously thought to be protein or protein-tannin, but which may probably contain significant amounts of insoluble oxalate.

In another embodiment of my invention the beer, in order to render it substantially oxalate-free, is passed down a column packed with a material which selectively fixes oxalate ion. Among the materials I have found effective are calcium sulfate, apatite (natural tricalcium phosphate) calcium carbonate (marble chips), dicalcium phosphate and calcium-saturated cation exchange resins.

These are best used in the form of coarsely ground granules of random size, preferably between ¼" and 50 mesh in size, the determining factor being a balance between the flow rate and the structural strength of the column packing, which is favored by larger size, and the contact surface exposed per unit of column volume which is favored by smaller size. Although all of the above substances are effective, columns of tricalcium phosphate or calcium-saturated cation exchange resins are preferred as these materials are less soluble and therefore introduce fewer ions into the finished product. Treatment is preferably carried out after the malt beverage has undergone preliminary clarification in ruh and storage and at least one filtration, but before final carbonation and final filtration, as this reduces the load on the column and minimizes the possibility of clogging the column with sediment from the beer which normally forms in storage.

In still another embodiment of this invention the malt beverage is rendered substantially free of oxalate by use of malt beverage absorption columns packed with anion-exchange resins. Beer containing its normal component of oxalate is passed through such packed columns which have been previously treated with anion having weaker affinity for the resin than oxalate, but which is more strongly bound to the resin than other anions principally occurring in beer. This is made possible by virtue of the fact that oxalate, being the simplest dicarboxylic acid, is more strongly adherent to strongly anionic aromatic amine type resins (for example: Dowex-1 and 2 made by Dow Chemical Company, Midland, Michigan, or Amberlite IRA–400 or 410 made by Rohm and Haas, Philadelphia, Pa.), than constituents of beer such as the proteins and amino acids, which contain some polar groups which are positively charged. Such relative affinities are, to some extent, dependent on the pH of the medium, particularly when working in the range normally encountered with malt beverages, between pH 3.8 and 5.2. Thus, by treating the column first with lactic acid or glycine, or a similar simple organic acid normal to the diet and present naturally in malt beverage, only the more strongly anionic constituents, chiefly oxalate, will adhere to the column when the malt beverage is passed through.

In another embodiment removal of oxalate from malt beverage is accomplished by removal of complex colloidal substances normally present which tend to prevent insoluble oxalate from precipitating completely. Although the exact nature of the substances responsible for holding oxalate in solution is not known, I have discovered that certain crude enzymes of fungal or bacterial origin which contain hemicellulases, as well as, perhaps, other undefined enzyme activity, when allowed to act on malt beverage at various stages of production, produce the result that substantially larger amounts of calcium oxalate precipitate from the malt beverage after such enzyme treatment than with untreated brew. This embodiment constitutes a substantial improvement when applied with the treatment described in my patent, above referred to, in which an excess of calcium is added to the brew to promote precipitation of oxalate as the insoluble calcium salt.

While the foregoing specification is believed fully to set forth the invention, a few specific examples follow in order to assure compliance with statutory requirements.

*Example 1*

The storage beer is treated with 1 lb. of crude enzyme material extracted from fungal sources (illustratively, but not limited to, *Schizophyllum commune, Collybia velutipus,* and/or *Polyporus hirsutus*) per 100 barrels of fluid. After remaining in storage for approximately one week or longer, the beer is finished by normal processing methods.

*Example 2*

During the mashing process, the mash is treated with 1 lb. of crude enzyme material concentrated from bacterial source per 1000 pounds of malt and adjunct employed in the brew. Illustratively, the treatment is carried out with a crude enzyme material prepared from growth of bacteria of uncertain species, possibly affiliated with the tribe Pseudomonadaceae, strains D–5, and N–2. The crude enzyme material is added to the foundation water immediately prior to the addition of the malt, and the normal time-temperature cycles are followed during mashing. The remainder of the process remains unaltered, and is conducted according to usual operating procedures.

*Example 3*

While the beer is being transferred from primary storage to secondary storage and has passed through a diatomaceous earth filter, it is also passed through a column packed with 20–50 mesh tricalcium phosphate. The oxalate absorbing capacity of such columns is quite high, so that the bed of tricalcium phosphate need be only a few inches in depth. After passage through this bed of tricalcium phosphate, which has a surface area approximately one-tenth to one-half that of the diatomaceous earth filter preceding it in the flow of beer, the beer is transferred to a storage tank where it is held at temperatures approximating 0° C. for at least three days. Thereafter, the beer is prepared for packaging according to usual procedures.

*Example 4*

The storage beer, preferably after preliminary filtration, is passed through a bed of anion exchange resin, illustratively Dowex-3 which has been pretreated with lactic acid to convert it to the lactate form.

What is claimed as new is:

In a method of preventing the gushing of packaged beer, the steps which comprise adding to the beer, prior to packaging the same, an enzyme which acts upon oxalic acid to convert it to carbon dioxide and formic acid, allowing said enzyme to act for a time sufficient to remove at least two-thirds of the oxalic acid present in said beer, and then packaging the resulting treated beer.

References Cited in the file of this patent
UNITED STATES PATENTS

| | | |
|---|---|---|
| 2,548,594 | Edmonds | Apr. 10, 1951 |
| 2,667,417 | Delmousee et al. | Jan. 26, 1954 |
| 2,711,963 | Gray | June 28, 1955 |
| 2,745,747 | Hennig | May 15, 1956 |
| 2,748,002 | Kneen | May 29, 1956 |
| 2,763,554 | Brenner | Sept. 18, 1956 |
| 2,848,371 | Yoshida | Aug. 19, 1958 |

OTHER REFERENCES

Journal of Biochemistry, vol. 42, No. 3, 1955, Japan, pp. 321–340. (Copy available in National Library of Medicine.)